Patented Nov. 29, 1927.

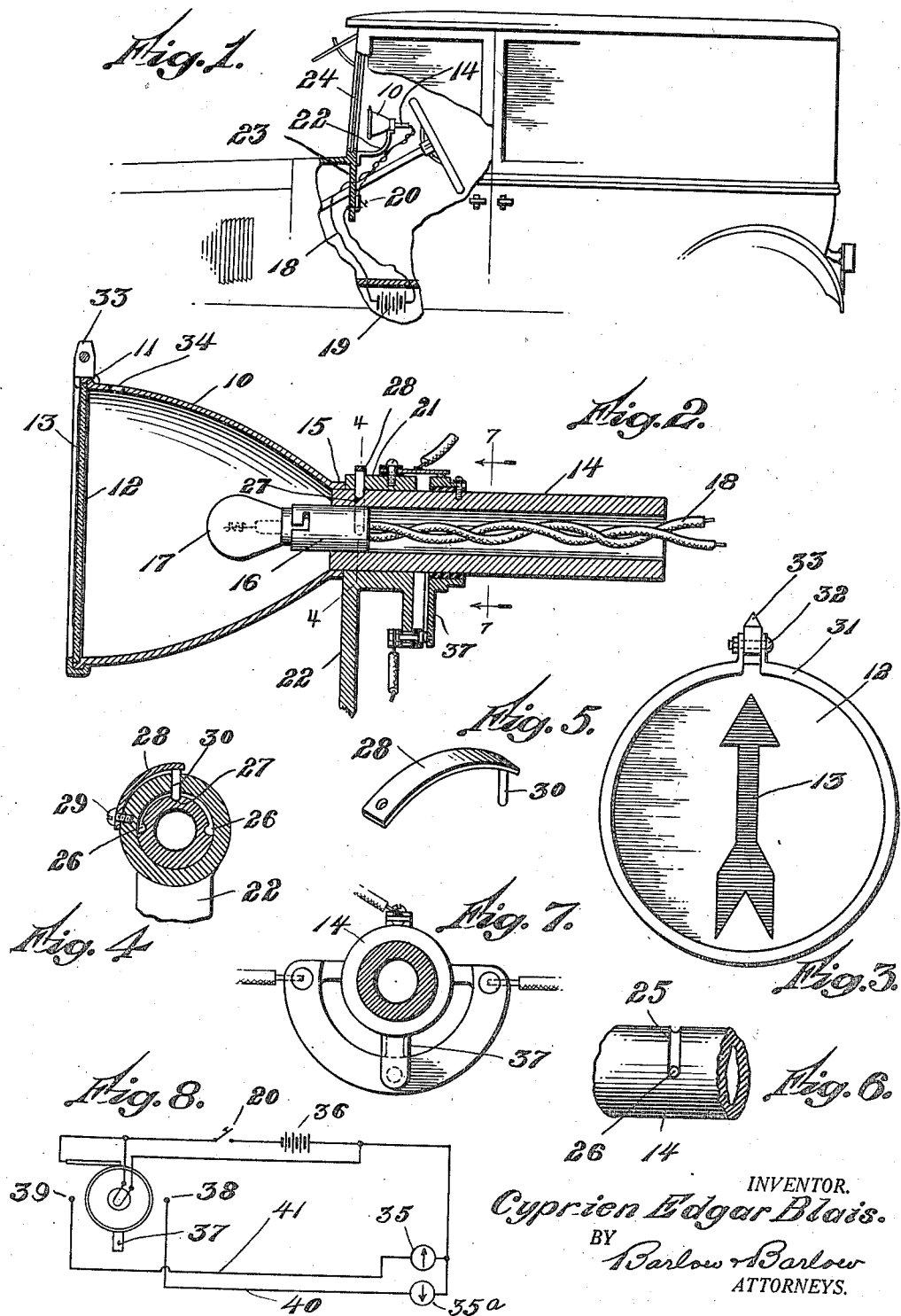

1,650,595

UNITED STATES PATENT OFFICE.

CYPRIEN EDGAR BLAIS, OF PAWTUCKET, RHODE ISLAND.

DIRECTION INDICATOR.

Application filed December 2, 1925. Serial No. 72,691.

This invention relates to improvements in direction indicators more particularly adapted for use on motor vehicles; and has for its object to provide a direction indicator of this character adapted to be attached adjacent the front windshield in position for ready manipulation from the driver's seat and to also provide means for illuminating the indicator so as to attract attention of the traffic officer being approached to indicate to him a change in the direction that the vehicle is about to make.

A further object of this invention is to position the indicating device so that its lens which faces forwardly will be inside of the car adjacent the windshield, and to provide an indicating pointer or arrow on the lens so that when the lamp in the light-reflecting indicator casing is lighted the arrow will be projected on the windshield and so clearly indicate to the operator the position to which he has turned the pointer, and also this arrow may be clearly seen by the traffic officer ahead, and if the windshield has become partially opaque by being covered with rain, snow or ice which would render it difficult to observe the indicator through the thus partially obscured glass the arrangement of the light and arrow will cause an enlarged shadow to be cast upon the partially opaque surface which can be clearly seen from a point ahead.

A further object of this invention is the provision of cooperating rear direction indicators which are arranged to be illuminated by the positioning of the front indicator, to indicate a direction corresponding to that indicated by the setting of the forward indicator so that a vehicle approaching from the rear may also know that a turn in another direction is contemplated by the occupants of the car.

With these and other objects in view, the invention consists of certain novel features of construction, as will be more fully described, and particularly pointed out in the appended claims.

In the accompanying drawings:

Figure 1 is a side elevation showing a portion of the vehicle partly broken away to illustrate my improved direction indicating device mounted therein in proximity to the windshield.

Figure 2 is a sectional side elevation of my improved direction indicator.

Figure 3 is a front view of the indicator showing the lens with the direction arrow thereon.

Figure 4 is a section on line 4—4 of Figure 2, showing the spring detent pin engaging the guide groove.

Figure 5 is a perspective view of the spring carrying its detent pin.

Figure 6 is a fragmental side elevation showing the groove in the operating handle for receiving the spring detent pin.

Figure 7 is a sectional view on line 7—7 of Fig. 2, showing the circuit closer as mounted on the operating handle for closing different electric circuits to illuminate the direction indicators at the rear of the car.

Figure 8 is a diagrammatic view illustrating an arrangement of lamp circuits by which the positioning of the front indicator closes the circuit to illuminate a corresponding rear indicator.

It is found in the practical operation of direction indicators for automobiles, particularly those used in closed cars, of advantage to mount a direction indicator inside of the car and in proximity to the windshield within easy reach of the operator and to illuminate this indicator so as to be observed by the traffic officer ahead. It is also found that by so projecting the light forwardly the indicating arrow is enlarged and projected on the windshield and this reflection may be seen by the driver to show him just where his arrow is pointing, and also this illuminated arrow will attract the attention of the traffic officer ahead. This is of advantage particularly on a stormy night when the windshield is covered with moisture, ice or snow which renders the glass more or less translucent and through which translucent glass the shadow of the arrow will be cast to be observed even when the indicating device on the inside of the car is almost invisible from a point ahead. It is also found of advantage to mount this direction indicator in a suitable bearing and to provide detent means for retaining the same when set in either its inoperative position or in its direction pointing positions; also to provide a stop at the end of either of its operating positions to prevent its being rotated beyond the desired point.

It is also found of advantage to provide means whereby the positioning of the forward indicator will show to the traffic officer ahead the direction about to be taken by the vehicle and also to provide means for simultaneously illuminating a rear indicator to show to a vehicle approaching from the rear that a change in direction is contemplated; and the following is a detailed description of the present embodiment of my invention and showing one means by which these advantageous results may be accomplished:—

With reference to the drawings, 10 designates the lamp casing which is preferably formed of metal having an interior light-reflecting surface, and this light-reflecting lamp casing is of a shape to project the light forwardly, the forward end of this reflector casing being preferably grooved as at 11 to receive the edge of the lens 12 which lens is preferably translucent and has on its surface an indicating arrow 13.

This reflector casing is provided with an operating handle 14 which is preferably tubular in form and is horizontally disposed, and to the forward end of which the neck portion 15 of the chamber is secured.

In this handle is mounted a lamp socket 16 in which a lamp 17 is secured in the usual way and through this tubular handle the lamp wires 18 are passed to transmit current from the battery 19 or other source, to the lamp, the circuit being controlled by a switch 20 on the dash. This reflector casing and its operating handle are rotatably mounted in the bearing 21 which is supported by bracket 22 from the dash 23 so as to support the indicating device on the inside of the windshield 24 and in proximity thereto and within easy access to the operator of the car.

In order to lock this handle 14 from endways movement in its bearing 21, I have grooved the handle as at 25, see Fig. 6, half way around, and at each end of the groove I have formed indentations 26 and half way between these ends I have formed an indentation 27.

On the bearing I have mounted a flat spring 28 which is fixed at one end 29 to the bearing, its opposite end being provided with a pin 30 which extends through a hole in the bearing into engagement with the groove 25 in the handle, the end of the pin being pressed into this slot, is adapted to snap into either one of the recesses 26 at the opposite ends of the groove to retain the indicator in either of its extreme positions also to snap into the intermediate recess 27 to retain the indicator when the arrow is pointing directly upwardly or in inoperative position.

The lens 12 in the front of the lamp casing is clamped therein by means of a band 31, the ends of which are drawn together by a screw 32 and between these ends, I have mounted a finger 33 which can be readily observed by the operator so that he may determine in just what direction the arrow is pointing which may be useful for this purpose particularly when the lamp in the reflector casing is not lighted.

A small aperture 34 is also formed in the casing through which light may be seen when the lamp is lighted to provide another means by which the operator may readily determine the position of the pointing arrow.

In some instances, I have found it of advantage to provide cooperating mechanism for operating a rear indicating signal which will also show to one approaching from the rear that a turn is contemplated by the occupants of the car and to provide means whereby the positioning of the front indicator will also operate the rear indicator to correspond thereto.

To accomplish this in a simple and effective way, I have provided two rear illuminating indicating signals 35 and 35ᵃ, each of which has a separate electric circuit communicating with the battery 36, and a circuit-closing finger 37 is mounted on and insulated from the handle 14, which finger when the handle is rotated and brought into contact with either the contacts 38 or the contact 39 to light the corresponding direction signals in the rear of the car.

When the forward direction indicator is moved so that its indicator 13 points to the left then the circuit is completed through a pin 38 and wires 40 to illuminate the lamp 35ᵃ, and when rotated in the opposite direction and the arrow is caused to point to the right, then the circuit is closed through contact 39 and wires 41 to illuminate lamp 35 at the rear to operate a corresponding indicator signal there. I have herein shown and described the indicating arrow as being mounted to be rotated through the rotation of the reflector casing but I do not wish to be restricted to this means of rotating the arrow as any means for such movement may be employed.

My improved direction indicator is very simple and practical in construction and is effective in its operation and by its use the attention of the traffic officer ahead may be attracted and he will be informed in advance of the direction to be taken by the vehicle either in the day time or at night or even when the windshield is obscured by rain, snow or ice.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In combination with the windshield of a vehicle, a light reflector mounted within the vehicle, a lamp mounted adjacent the reflector, an indicating device positioned intermediate the reflector and the windshield and spaced from the windshield whereby its image is projected upon the windshield when the lamp is lighted, said parts being so arranged that the reflection of the indicator in the windshield is visible to the driver, and means for moving the indicating device.

2. In combination with the windshield of a vehicle, a lamp having a reflector and mounted within the vehicle, an indicating device positioned intermediate the reflector and the windshield and a substantial distance back from the windshield, whereby the image of the indicator is enlarged and projected upon the windshield when the lamp is lighted, and means for moving the indicator.

3. In a vehicle, a windshield, a light projecting device including a lamp and a reflector mounted in the vehicle behind the windshield, an indicator device mounted intermediate said reflector and windshield and spaced from the windshield to have its image projected onto the windshield when the lamp is lighted, and means for moving the indicator.

4. In a vehicle, a windshield, a light projecting device including a lamp and a reflector mounted in the vehicle behind the windshield, an indicator device mounted intermediate said reflector and windshield and spaced from the windshield to have its image projected onto the windshield when the lamp is lighted, and means for moving said indicator.

5. In a vehicle, a windshield, a light projecting device including a lamp and a co-operating reflector mounted in the vehicle behind the windshield, an indicating device carried by the projecting device intermediate the reflector and windshield and spaced from the windshield, whereby the image of the indicating device is enlarged and projected upon the windshield, and means for rotating the light-projecting device and the indicator.

6. In combination with the windshield of a vehicle, a direction indicator comprising a rotatably mounted reflecting lamp casing having a lens at its forward end facing the windshield, a lamp in the casing, a direction indicating pointer positioned intermediate the light and windshield and spaced from the windshield carried by said casing whereby the image of the pointer is enlarged and projected onto the windshield, and an operating handle on said casing.

7. In combination with the windshield of a vehicle, a direction indicator mounted clear of and to the rear of the windshield including, a lamp casing having a reflecting surface and having a lens in its forward end, a lamp adjacent said reflector in the casing, a direction pointer carried by said lens and positioned and projected onto the windshield when the lamp is lighted, an operating handle on the casing, a circuit including said lamp, and manually operable means for controlling said circuit.

8. A direction indicator for vehicles, comprising a rotatable lamp casing having a light-reflecting surface and located in the vehicle behind the windshield and spaced from the windshield, a lens in the forward end of the casing carrying a direction pointer, a lamp in the casing adjacent the reflector surface arranged to project the image of the pointer onto the windshield, an operating handle on the casing for moving the same and the pointer to different directing positions, a bracket for supporting the casing behind the windshield in convenient operating position from the driver's seat, and means on the casing for indicating the position of the pointer.

In testimony whereof I affix my signature.

CYPRIEN EDGAR BLAIS.